Aug. 23, 1949.           A. C. HOWARD           2,479,931
ADJUSTABLE TRACTOR STEERING ASSEMBLY
Filed Nov. 25, 1947
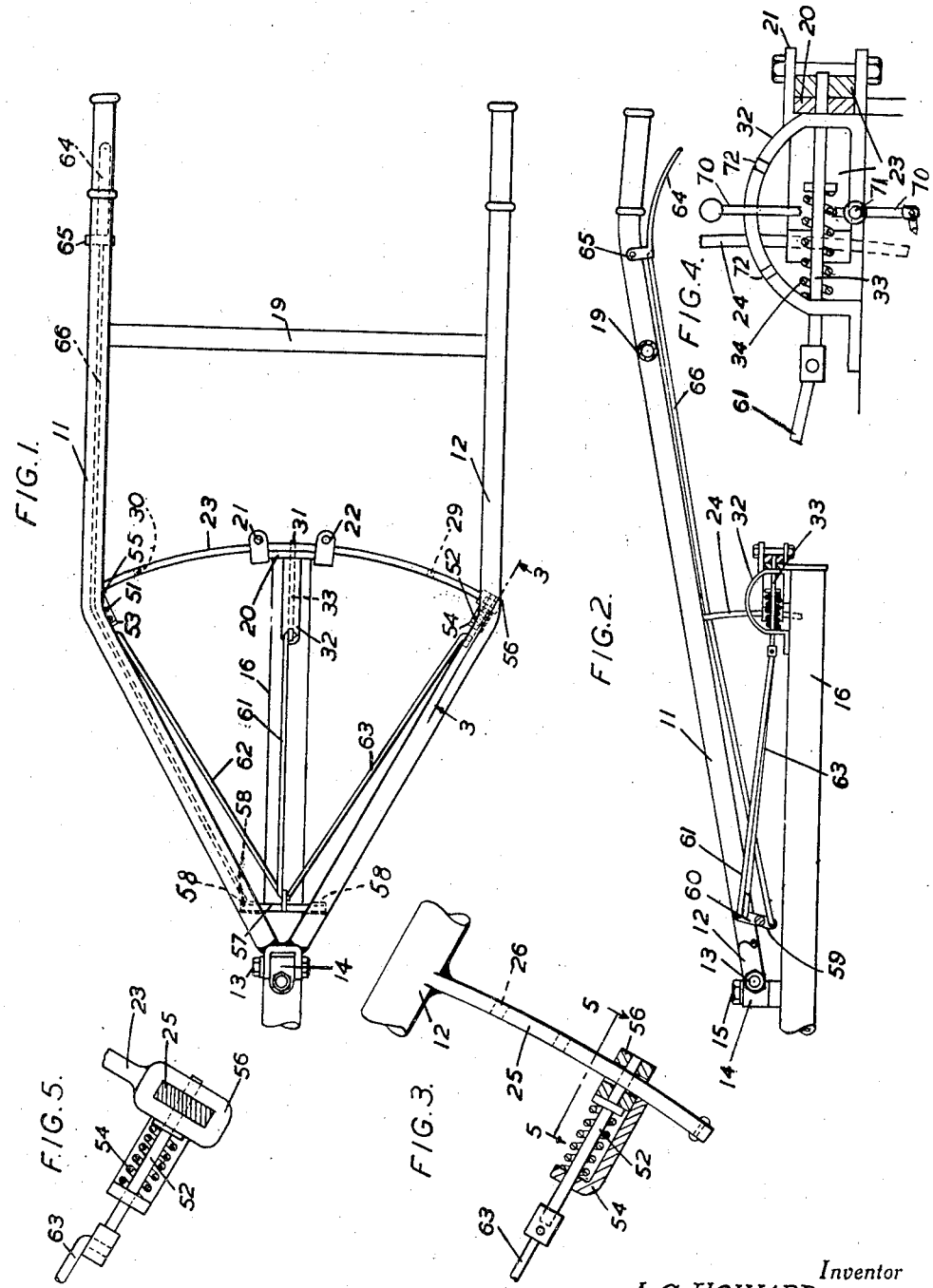
Inventor
A. C. HOWARD
By
Mawhinney & Mawhinney
Attorneys Patented Aug. 23, 1949

2,479,931

UNITED STATES PATENT OFFICE 2,479,931

ADJUSTABLE TRACTOR STEERING ASSEMBLY

Arthur Clifford Howard, Upminster, England

Application November 25, 1947, Serial No. 787,886
In Great Britain July 3, 1944

Section 1, Public Law 690, August 8, 1946
Patent expires July 3, 1964

6 Claims. (Cl. 74—484)

This invention relates to a garden tractor, rotary hoe, or like agricultural machines (all of which are intended to be included by the term "garden tractors," unless the context specifies otherwise), of the kind having its own power plant and adapted to be guided by handlebars held by an operator who walks with the machine during its use.

It has been proposed, with a garden tractor of this kind, to make the handlebars adjustable laterally about a vertical pivot so as to avoid the operator being constrained to walk on the earth that has been tilled, the adjustment being controlled from the handlebars. Also, it has been proposed for the handlebars to be assembled to the machine in such a manner that, by slackening the connection when the machine is stationary, they can be pre-set at an inclination suitable to the height of the operator.

My object is to provide an improved garden tractor of the kind set forth.

According to the invention, the handlebars are pivotally supported from the control beam or other suitable portion of the garden tractor, so as to be capable of being swung, selectively, about a vertical (or substantially vertical) axis, or about a horizontal (or substantially horizontal) axis, or about both of the said axes, into alternative positions during the normal operation of the machine, and means, operable from the handlebars, are provided for locking them in the position selected. In this way, the handlebars may be swung to opposite sides of the machine during successive traverses over a piece of land so that the operator can avoid walking on the land already tilled, or they can be swung vertically to enable the machine to work in a trench with the operator at ground level. Some or all of the controls of the garden tractor may be mounted on the handlebars if their position would otherwise be inconvenient of access when the position of the handlebars has been adjusted.

In the drawings, which illustrate an embodiment of the invention;

Figure 1 is a plan view of the handlebar arrangement for a garden tractor, the latter being constructed in the manner of my British specification No. 547,415;

Figure 2 is a side elevation of Figure 1 with the nearer handlebar broken away;

Figure 3 is a section on the line 3—3 of Figure 1 showing the height adjustment means;

Figure 4 is a detail view of the locking means for the horizontal adjustment, drawn to a larger scale; and Figure 5 is a section on the line 5—5 of Figure 3.

Referring to the drawings, a pair of handlebars 11, 12, is pivoted at 13, for vertical swinging movement, to a block 14 which is in turn pivoted, for horizontal swinging movement, on a vertical stub 15 secured to the control bar 16 of the garden tractor, the handlebars being stayed at 19. The rear of the control bar is provided with a bracket 20 having a pair of horizontally spaced guides 21, 22, which receive an arcuate locking bar 23 connected (as hereinafter described) at its ends to the handlebars.

The bar 23 is preferably provided with three holes 29, 30, 31, to provide a right-hand, a left-hand, and a central position, respectively, for the handlebars, when those holes are selectively engaged by the bolt of the locking device.

The locking device preferably comprises an arcuate strap 32 secured to the top of the control bar 16 having bearings in its opposite sides for a bolt 33 adapted to project, under the influence of a loading spring 34, through a hole in the guide bracket 20 and into one of the holes 29, 30, 31, in the locking bar. The locking bar 23 is connected at its ends to the handlebars by two downwardly projecting arms 24, 25 (which are arcuate about the pivot 13), welded or otherwise secured to the handlebars, and each of these arms has a series of holes 26 for selective engagement by a locking device mounted on the locking bar so that the height of the handlebars can be adjusted as required.

These two locking devices may be spring-loaded plungers 51, 52, operating in guides 53, 54, attached to housings 55, 56, at the ends of the locking bar 23 and adapted to enter the holes 26, selectively, in the depending arms 24, 25, which latter pass through the housings 55, 56.

Means are provided for enabling the locking devices for the horizontal and vertical adjustments to be operated by the same control, preferably so that such control shall, when moved into one position, first free the handlebars for horizontal adjustment and then, when moved into another position, free them for vertical adjustment.

According to one such arrangement, a spindle 57 is pivoted in lugs 58 on the handlebars in a position as near as possible to the pivot 13, and is provided with two arms 59, 60. The bolt 33 is connected by a link 61, with hooked ends, to an upper position on the arm 60, and the plungers 51 and 52 are similarly connected by links 62, 63 (which may be formed in one piece), to a lower position on the said arm. A single control lever 64, pivoted at 65 to the right handlebar, is also similarly connected by a link 66 to the arm 59. The relative positions on the arm 60 of the rods 61 and, 62 and 63, are such as to enable unlocking of the bolt 33, for horizontal adjustment to be effected by a partial movement of the lever 64 without unlocking the plungers 51, 52 which control the height of the handlebars; further movement of the lever 64 unlocks the handlebars for vertical adjustment. Conveniently, the shift lever 70 (shown broken away in Figure 4) for changing the drive ratio of the machine according to my said prior specification, and the shift lever (obscured by the lever 70) for putting the rotor into and out of operation, are pivoted at 71 at the geometric centre of the strap 32, and the latter provided with recesses 72 in its sides for locating the shift levers in their selected positions; a common spring, if required, being provided to urge the shift levers into the recesses.

The other controls (e. g., for the engine throttle and the clutch) for the garden hoe can be carried by the handlebars in such a manner that they are not influenced when the latter are adjusted to a new position.

What I claim as my invention and desire to secure by Letters Patent of the United States is:

1. A motor-driven garden tractor comprising a pair of handlebars pivotally supported therefrom for relative angular movement about substantially horizontal and vertical axes, means for locking said handlebars in any one of a plurality of alternative angular positions about said substantially vertical axis, means for locking said handlebars in any one of a plurality of alternative angular positions about said substantially horizontal axis, and means at the hand-held end of said handlebars for controlling both said locking means.

2. A motor-driven garden tractor comprising a pair of handlebars pivotally supported therefrom for relative angular movement about substantially horizontal and vertical axes, an arcuate locking bar interconnecting the limbs of the handlebars and concentric with said substantially vertical axis, guide means fast with a relatively-stationary part of the tractor for said locking bar, locking means fast with said guide means and for coaction with any one of a series of holes in said locking bar whereby the handlebars can be locked in alternative angular positions in a transverse plane, means for locking said handlebars in any one of a plurality of alternative angular positions about said substantially horizontal axis, and means at the hand-held end of said handlebars for controlling both said locking means.

3. A motor-driven garden tractor, according to claim 2, of which the locking means for the arcuate locking bar comprises a housing fast with a relatively-stationary part of the tractor, a locking bolt slidable in said housing and for coaction, when in its shot position, with the holes in said locking bar, spring means for urging said locking bolt into its shot position, and means interconnecting said locking bolt and the said controlling means whereby said locking bolt can be withdrawn from engagement with one of the holes in said locking bar.

4. A motor-driven garden tractor, according to claim 3, of which said housing includes an arcuate part which is concentric with the pivot of a lever which is one of the normal tractor controls, the adjacent side of said arcuate part having notches for selective engagement by said lever to hold the latter in alternative controlling positions.

5. A motor-driven garden tractor comprising a pair of handlebars pivotally supported therefrom for relative angular movement about substantially horizontal and vertical axes, an arcuate locking bar concentric with said substantially vertical axis, guide means fast with a relatively-stationary part of the tractor for said locking bar, a housing at each end of said locking bar, an arm respectively fast with each limb of said handlebars and arcuate about said substantially horizontal axis, said arms being respectively guided in said housings, locking means fast with said housings and for coaction with any one of a series of holes in said arms whereby the handlebars can be locked in alternative inclined positions, locking means fast with said guide means and for coaction with any one of a series of holes in said locking bar whereby the handlebars can be locked in alternative angular positions in a transverse plane, and means at the hand-held end of said handlebars for controlling the locking means for said arms and for said locking bar.

6. A motor-driven garden tractor, according to claim 5, of which the means for controlling the locking means comprises a rockable lever pivoted to the handlebars adjacent the pivotal connection of the latter to the tractor, a link interconnecting said rockable lever and the locking bolt for said locking bar, link means interconnecting said rockable lever and the locking bolts for said arms, an operating hand-lever pivoted adjacent the hand-held end of one limb of said handlebars, and a link interconnecting said hand-lever and said rockable lever, the points of connection of the two links and the link means to said rockable lever being such that a partial movement of said hand-lever unlocks said locking bar, for effecting a transverse adjustment of said handlebars, and a continued movement of said hand-lever unlocks said arms for effecting a vertical adjustment of said handlebars.

ARTHUR CLIFFORD HOWARD.

REFERENCES CITED

The following references are of record in the file of this patent:

UNITED STATES PATENTS

| Number | Name | Date |
|---|---|---|
| 1,370,538 | Hogg | Mar. 8, 1921 |
| 1,807,784 | Geffroy | June 2, 1931 |
| 2,401,796 | Raitch | June 11, 1946 |